N. C. NEVIN.
DRESS SHIELD.
APPLICATION FILED OCT. 4, 1912.

1,048,727.

Patented Dec. 31, 1912.

WITNESSES.
Mary B Bartt
Nellie B. McMillan

INVENTOR.
Nina Carnaghan Nevin
by
Harry Fredrich Merer
her attorney

UNITED STATES PATENT OFFICE.

NINA CARNAGHAN NEVIN, OF SEWICKLEY, PENNSYLVANIA.

DRESS-SHIELD.

1,048,727.  Specification of Letters Patent.  Patented Dec. 31, 1912.

Application filed October 4, 1912.  Serial No. 723,859.

*To all whom it may concern:*

Be it known that I, NINA CARNAGHAN NEVIN, a citizen of the United States of America, residing at Sewickley, in the county of Allegheny and State of Pennsylvania, have invented a new and useful Improvement in Dress-Shields, of which the following is a full, clear, and exact description, reference being had to the accompanying drawings, forming part of this specification.

My invention relates to an improvement in dress shields such as are described in United States Letters Patent No. 946,766 granted to me January 18th, 1910; and it consists in so forming the scales that they shall maintain a more uniform position and at all times present a flexible shield surface under any movement of the shield.

I will now describe my invention so that others skilled in the art may employ the same: reference being had to the accompanying drawings, forming part of this specification, in which—

Figure 1:
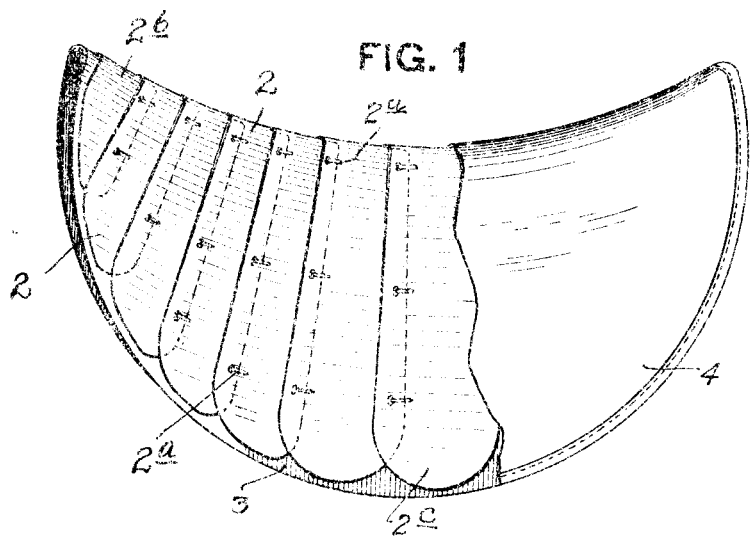
Figure 2:
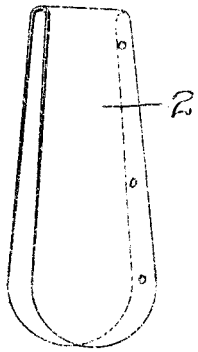

Figure 1 is a side elevation partly broken away and showing an arm-pit shield showing my invention; and Fig. 2 is a perspective view of a scale, showing the outline and fold thereof.

As disclosed in my above mentioned patent, the invention, broadly considered, comprises a shield having a suitable backing to which is secured, in such manner as to provide free ventilation, a series of light, flexible scales which are impervious to moisture.

The present invention has to do with the formation or shape of the scales and the mounting thereof upon the backing, both features aiming to provide more uniformity in position of the parts and perfect articulation and manipulation.

The scales in the accompanying drawings are indicated by the numeral 2 and are preferably composed of thin, elongated disks of celluloid; although I do not desire to limit myself to the use of this substance, as other substances may be substituted therefor. These scales are preferably U-shaped, as shown in Fig. 2, so that there is provided at the top or apex of the shield proper a smoothly curved surface which obviates chafing or catching of the scales on the backing on which the scales are mounted, or the covering thereover.

The backing, indicated by the numeral 3, may be of linen or other suitable material and to which the scales are fastened preferably along one edge, as at $2^a$, by means of a suitable thread passed through an opening in the scales and secured to the backing. This backing is of the regular folded-over arm-pit shape common to shields of this character. As stated, the scales are preferably U-shaped, so as to straddle the top of the shield and continuous, passing up one side over to the other side, the shank or body of the scale being symmetrically formed and disposed on each side of the folded backing 3 and also symmetrically graded from the small end or terminal scale $2^b$ to the large central, or approximately central, scale $2^c$. The scales are preferably fastened along one edge at each side of the shield so as to render the other and overlapping edge in each scale free to slide upon the next adjacent scale in the movement or flexing of the shield when in use. The covering 4, which is placed over the scales, may be of thin net or such other suitable material as will permit of access of the atmosphere to, and the consequent drying of the, moist scales.

By the use of the term "celluloid" I desire to include all celluloid-like substances as, for instance, celluloid in which urea or naphthalene is used as a substitute for camphor or in addition thereto. By the use of the term shield I desire to include all of that portion comprising both the scales and backing.

My improved shield is much lighter and cooler than other shields; it is more efficient in protecting garments than the shields now in common use; and it can be worn without discomfort to the wearer as the scales are yieldable and flexible and adapt themselves to the movement of the body without sticking, pinching, or binding.

Having thus described my invention, what I claim and desire to secure by Letters Patent is:

1. A dress shield having a series of scales, each scale extending from the bottom of the shield to the top thereof and arranged in juxtaposition to each other.

2. A dress shield having a series of U-shaped integral scales which extend from the bottom of one side of the shield to the bottom of the other.

3. A dress shield having a series of U-shaped overlapping scales, each scale extending radially from the top to the bottom of the shield, a flexible backing and flexible fastenings for securing the scales along one edge of the same to the backing.

In testimony whereof I have hereunto set my hand.

NINA CARNAGHAN NEVIN.

Witnesses:
ELMER K. HENRY,
H. FRED MERCER.